(12) United States Patent
Killelea

(10) Patent No.: US 6,697,816 B2
(45) Date of Patent: Feb. 24, 2004

(54) SYSTEM FOR GENERATING INDUSTRY-SPECIFIC INDUSTRY STATISTICAL INFORMATION

(75) Inventor: Stephen Killelea, Newport Beach (AU)

(73) Assignee: Integrated Research Limited, North Sydney (AU)

( * ) Notice: Subject to any disclaimer, the term of this patent is extended or adjusted under 35 U.S.C. 154(b) by 334 days.

(21) Appl. No.: 09/852,276

(22) Filed: May 10, 2001

(65) Prior Publication Data

US 2002/0004797 A1 Jan. 10, 2002

(30) Foreign Application Priority Data

May 12, 2000 (AU) ................................................ PQ7469

(51) Int. Cl.[7] ................................................ G06F 7/00
(52) U.S. Cl. .................... 707/102; 707/100; 707/104.1; 705/70
(58) Field of Search ............................... 707/100–104.1; 705/7, 10; 377/27, 39; 235/375–376; 702/179, 182, 187

(56) References Cited

U.S. PATENT DOCUMENTS

| | | | | |
|---|---|---|---|---|
| 5,339,257 A | * | 8/1994 | Layden et al. | 702/84 |
| 5,355,327 A | * | 10/1994 | Stent et al. | 702/187 |
| 6,304,904 B1 | * | 10/2001 | Sathyanarayan et al. | 709/224 |
| 6,366,901 B1 | * | 4/2002 | Ellis | 707/2 |
| 6,553,369 B1 | * | 4/2003 | Guay et al. | 707/3 |

\* cited by examiner

*Primary Examiner*—Greta Robinson
*Assistant Examiner*—Linh Black
(74) *Attorney, Agent, or Firm*—Larson & Taylor, PLC

(57) ABSTRACT

A system (10) and method is disclosed for generating and supplying industry-specific statistical information relating to use of computer systems in an industry. The system (10) comprises a data gathering application (12, 14) for gathering non-sensitive computer system data from a plurality of members of the industry, a system database application (24) for storing the gathered data, and a data forwarding application (13, 15) for forwarding the gathered data to the system database application (24). The system database application (24) is arranged to generate and provide each member with statistical information indicative of a comparison of characteristics of the member's computer systems with average characteristics of a plurality of members' computer systems.

33 Claims, 7 Drawing Sheets

System Overview

|  | Total In Use | % /28 | Change | Change % | Industry Average | % /30 | Industry Change | Industry Change % |
|---|---|---|---|---|---|---|---|---|
| CLX | 0 | 0.0% | 0 | 0.0% | 0.2 | 3.7% | -0.2 | -50.0% |
| K100/200 | 2 | 40.0% | 0 | 0.0% | 1.7 | 31.5% | -0.1 | -5.6% |
| K1000/2000 | 0 | 0.0% | 0 | 0.0% | 0.9 | 16.7% | 0 | 0.0% |
| K10000/20000 | 1 | 20.0% | 0 | 0.0% | 0.7 | 13.0% | 0.1 | 16.7% |
| S7000 | 1 | 20.0% | 0 | 0.0% | 1.2 | 22.2% | 0.1 | 9.1% |
| S70000 | 1 | 20.0% | 0 | 0.0% | 0.7 | 13.0% | 0.2 | 40.0% |
| Other | 0 | 0.0% | 0 | 0.0% | 0 | 0.0% | -0.1 | -100.0% |
| *Total* | *5* | *100.0%* | *0* | *0.0%* | *5.4* | *100.0%* | *0.1* | *1.9%* |

Operating System Overview /32

|  | Total In Use | % | Change | Change % | Industry Average | % | Industry Change | Industry Change % |
|---|---|---|---|---|---|---|---|---|
| C Series | 0 | 0.0% | 0 | 0.0% | 0 | 0.0% | -0.1 | -100.0% |
| D2x | 0 | 0.0% | 0 | 0.0% | 0.5 | 9.3% | -0.5 | -50.0% |
| D3x | 0 | 0.0% | -1 | -100.0% | 0.9 | 16.7% | -0.3 | -25.0% |
| D4x | 3 | 60.0% | 1 | 50.0% | 2.8 | 51.9% | 0.2 | 7.7% |
| G03 | 0 | 0.0% | 0 | 0.0% | 0.7 | 13.0% | 0.5 | 250.0% |
| G06 | 2 | 40.0% | 0 | 0.0% | 0.4 | 7.4% | 0.3 | 300.0% |
| Other | 0 | 0.0% | 0 | 0.0% | 0.1 | 1.9% | 0 | 0.0% |
| *Total* | *5* | *100.0%* | *0* | *0.0%* | *5.4* | *100.0%* | *0.1* | *1.9%* |

Fig. 2a

Availability Comparison

| | This Month | Last Month | % Change | Qtr to date | Last Qtr | % Change | Year to Date | Last Year | % Change |
|---|---|---|---|---|---|---|---|---|---|
| ABC Co. | | | | | | | | | |
| CPU | 100.00% | 99.90% | 0.10% | 99.94% | 100.00% | -0.06% | 99.99% | 100.00% | -0.01% |
| Disks | 97.30% | 92.16% | 5.58% | 94.78% | 98.70% | -3.97% | 98.37% | 98.21% | 0.16% |
| X.25 Lines | 84.79% | 85.12% | -0.39% | 85.23% | 86.14% | -1.06% | 86.93% | 88.13% | -1.36% |
| Applications | 94.37% | 97.81% | -3.52% | 96.21% | 95.93% | 0.29% | 96.38% | 97.28% | -0.93% |
| Servers | 98.38% | 98.48% | -0.10% | 98.83% | 99.12% | -0.29% | 98.14% | 99.11% | -0.98% |
| SNA Lines | 92.01% | 92.16% | -0.16% | 92.17% | 92.74% | -0.61% | 92.99% | 91.10% | 2.07% |
| LAN | 99.23% | 99.19% | 0.04% | 99.11% | 99.34% | -0.23% | 99.04% | 99.15% | -0.11% |
| Tape Drives | 100.00% | 99.98% | 0.02% | 99.99% | 100.00% | -0.01% | 99.99% | 99.98% | 0.01% |
| Industry | | | | | | | | | |
| CPU | 100.00% | 100.00% | - | 100.00% | 99.99% | 0.01% | 100.00% | 100.00% | - |
| Disks | 96.38% | 95.49% | 0.93% | 98.27% | 97.73% | 0.55% | 97.39% | 97.71% | -0.33% |
| X.25 Lines | 93.29% | 91.23% | 2.26% | 94.38% | 93.28% | 1.18% | 90.29% | 91.29% | -1.10% |
| Applications | 91.28% | 92.19% | -0.99% | 93.28% | 91.28% | 2.19% | 92.38% | 92.37% | 0.01% |
| Servers | 98.94% | 97.68% | 1.29% | 98.47% | 98.63% | -0.16% | 98.75% | 98.65% | 0.10% |
| SNA Lines | 95.48% | 95.83% | -0.37% | 96.48% | 94.83% | 1.74% | 97.73% | 96.38% | 1.40% |
| LAN | 97.28% | 98.29% | -1.03% | 97.33% | 98.38% | -1.07% | 96.29% | 97.92% | -1.66% |
| Tape Drives | 99.99% | 100.00% | -0.01% | 99.94% | 99.89% | 0.05% | 99.87% | 99.20% | 0.68% |
| Deviation | | | | | | | | | |
| CPU | - | -0.10% | 0.10% | -0.06% | 0.01% | -0.07% | -0.01% | - | -0.01% |
| Disks | 0.92% | -3.33% | 4.25% | -3.49% | 0.97% | -4.46% | 0.98% | 0.50% | 0.48% |
| X.25 Lines | -8.50% | -6.11% | -2.39% | -9.15% | -7.14% | -2.01% | -3.36% | -3.16% | -0.20% |
| Applications | 3.09% | 5.62% | -2.53% | 2.93% | 4.65% | -1.72% | 4.00% | 4.91% | -0.91% |
| Servers | -0.56% | 0.80% | -1.36% | 0.36% | 0.49% | -0.13% | -0.61% | 0.46% | -1.07% |
| SNA Lines | -3.47% | -3.68% | 0.21% | -4.31% | -2.09% | -2.22% | -4.75% | -5.28% | 0.53% |
| LAN | 1.95% | 0.90% | 1.05% | 1.78% | 0.96% | 0.82% | 2.75% | 1.23% | 1.52% |
| Tape Drives | 0.01% | -0.02% | 0.03% | 0.05% | 0.11% | -0.06% | 0.12% | 0.78% | -0.66% |

Fig. 4

| Best Practice Availability Hardware Summary | | |
|---|---|---|
| Component | Type | % in Use |
| System | K10000 | 81% |
|  | K2000 | 64% |
| Operating System | D20 | 68% |
| Disk | 4608-3 | 100% |
|  | 4605-3 | 82% |
|  | 4255-1 | 79% |
|  | 4560-1 | 63% |
| Tape | 5170 | 100% |

Best Practice Availability Hardware Usage

| System | | | |
|---|---|---|---|
|  | All Top 5 | K10000 | K2000 |
| Busy % | 32.76% | 29.73% | 35.29% |
| Q Len | 0.4 | 0.3 | 0.5 |
| Swaps | 0.3 | 0.3 | 0.3 |
| Free Mem | 1092 | 983 | 1251 |
| Free PCB | 782 | 717 | 832 |

| Disk | | | | | |
|---|---|---|---|---|---|
|  | All Top 5 | 4608-3 | 4605-3 | 4255-1 | 4560-1 |
| Capacity | 7364 | 4048 | 8126 | 4048 | 2048 |
| Free Space | 2092.85 | 1067.46 | 2570.25 | 927.40 | 600.47 |
| % Free Space | 28.42% | 26.37% | 31.63% | 22.91% | 29.32% |
| Avg Busy | 12.82% | 11.82% | 12.21% | 13.18% | 12.62% |
| Avg Qlen | 0.2 | 0.2 | 0.3 | 0.2 | 0.2 |

Fig. 8

SYSTEM FOR GENERATING INDUSTRY-SPECIFIC INDUSTRY STATISTICAL INFORMATION

FIELD OF THE INVENTION

The present invention relates broadly to a system for generating industry-specific statistical information relating to use of technology in an industry and to providing members of the system with such information.

BACKGROUND OF THE INVENTION

Due to the multiplicity of different technologies available to organisations in an industry and to the speed of uptake and development of new technologies, it has become increasingly difficult for organisations to make informed decisions regarding the adoption, replacement and/or upgrade of new technologies.

SUMMARY OF THE INVENTION

In accordance with a first aspect of the present invention, there is provided a system for generating and supplying industry-specific statistical information relating to use of computer systems in an industry, the system comprising:
  a data gathering application for gathering non-sensitive computer system data from a plurality of members of the industry;
  a system database application for storing said gathered data; and
  a data forwarding application for forwarding said gathered data to said system database application;
  the system database application being arranged to generate and provide each member with statistical information indicative of a comparison of characteristics of the member's computer systems with average characteristics of a plurality of members' computer systems.

The statistical information may be in the form of at least one report.

Preferably, the statistical information is forwarded to the members by the system database application. The statistical information may be forwarded to the member periodically.

The statistical information may include information relating to adoption of new technology, availability of technology, performance of technology, existence of technology within an organisation, costs of technology or failure rate of technology.

The system may include a plurality of member databases, each member database being associated with and located at a member organisation, and each member database being arranged to store said gathered system data locally at the respective member organization. Each member database may be arranged to allow access to the member database by the respective member associated with the member database.

The system database application may include a system database for storing said gathered data which has been forwarded from the member organisations.

The system may be arranged such that the data gathering application is controllable by the respective member such that the type of data gathered by the data gathering application is selectable and/or modifiable by the respective member.

Preferably, the data forwarded to and stored in the system database application is not directly accessible by the members.

The statistical information may be represented in the form of at least one table.

Alternatively or in addition, the statistical information may be represented in the form of at least one graph.

In accordance with an alternate aspect of the present invention, there is provided a method of generating and supplying industry-specific statistical information relating to use of computer systems in an industry, the method comprising the steps of:
  gathering non-sensitive computer system data from a plurality of members of the industry;
  providing a system database application for storing said gathered data;
  forwarding said gathered data to said system database application; and
  generating and providing each member with statistical information indicative of a comparison of characteristics of the member's computer systems with average characteristics of a plurality of members' computer systems.

In accordance with a further alternate aspect of the present invention, there is provided a statistics generating application for generating and supplying industry-specific statistical information relating to use of computer systems in an industry, said application comprising:
  a system database application for receiving non-sensitive computer system data from a plurality of members of the industry, for storing said received data, and for generating and providing each member with statistical information indicative of a comparison of characteristics of the member's computer systems with average characteristics of a plurality of members' computer systems.

In accordance with a further aspect of the present invention, there is provided a method of generating and supplying industry-specific statistical information relating to use of computer systems in an industry, the method comprising the steps of:
  receiving non-sensitive computer system data from a plurality of members of the industry;
  providing a system database application for storing said gathered data; and
  generating and providing each member with statistical information indicative of a comparison of characteristics of the member's computer systems with average characteristics of a plurality of members' computer systems.

In accordance with a further alternate aspect of the present invention, there is provided a data gathering system for use in generating and supplying industry-specific statistical information relating to use of computer systems in an industry, said system comprising:
  a data gathering application for gathering non-sensitive computer system data from a member of an industry; and
  a data forwarding application for forwarding said gathered data to a system database application;
  the data gathering system being arranged to receive statistical information indicative of a comparison of characteristics of the member's computer systems with average characteristics of a plurality of members' computer systems, and to display the statistical information to a user.

In accordance with a further alternate aspect of the present invention, there is provided a computer program which when loaded onto a computer causes the computer to operate in accordance with a data gathering system for use in generating and supplying industry-specific statistical information relating to use of computer systems in an industry, said system comprising:

a data gathering application for gathering non-sensitive computer system data from a member of an industry; and a data forwarding application for forwarding said gathered data to a system database application;

the data gathering system being arranged to receive statistical information indicative of a comparison of characteristics of the member's computer systems with average characteristics of a plurality of members' computer systems, and to display the statistical information to a user.

In accordance with a further alternate aspect of the present invention, there is provided a computer readable medium having a computer program embodied therein which when loaded onto a computer causes the computer to operate in accordance with a data gathering system for use in generating and supplying industry-specific statistical information relating to use of computer systems in an industry, said system comprising:

a data gathering application for gathering non-sensitive computer system data from a member of an industry; and a data forwarding application for forwarding said gathered data to a system database application;

the data gathering system being arranged to receive statistical information indicative of a comparison of characteristics of the member's computer systems with average characteristics of a plurality of members' computer systems, and to display the statistical information to a user.

BRIEF DESCRIPTION OF THE DRAWINGS

FIGS. 2 to 8 show example reports of statistical information generated by a system in accordance with an embodiment of the present invention

DETAILED DESCRIPTION OF THE PREFERRED EMBODIMENT

The invention will be described in relation to a system having associated member organisations which provide the system with industry-specific information for processing and generating reports for use by the members.

In a broad sense, the invention operates so as to provide a system which collects computer system data from a plurality of member organisations, and which processes the information so as to generate statistical information which can be used by each member to compare the member organisation with industry standards and industry best practices. This enables the member organisations to acquire a greater understanding of the industry so that more effective decisions can be made regarding the computer systems of the organisation.

Figure 1:
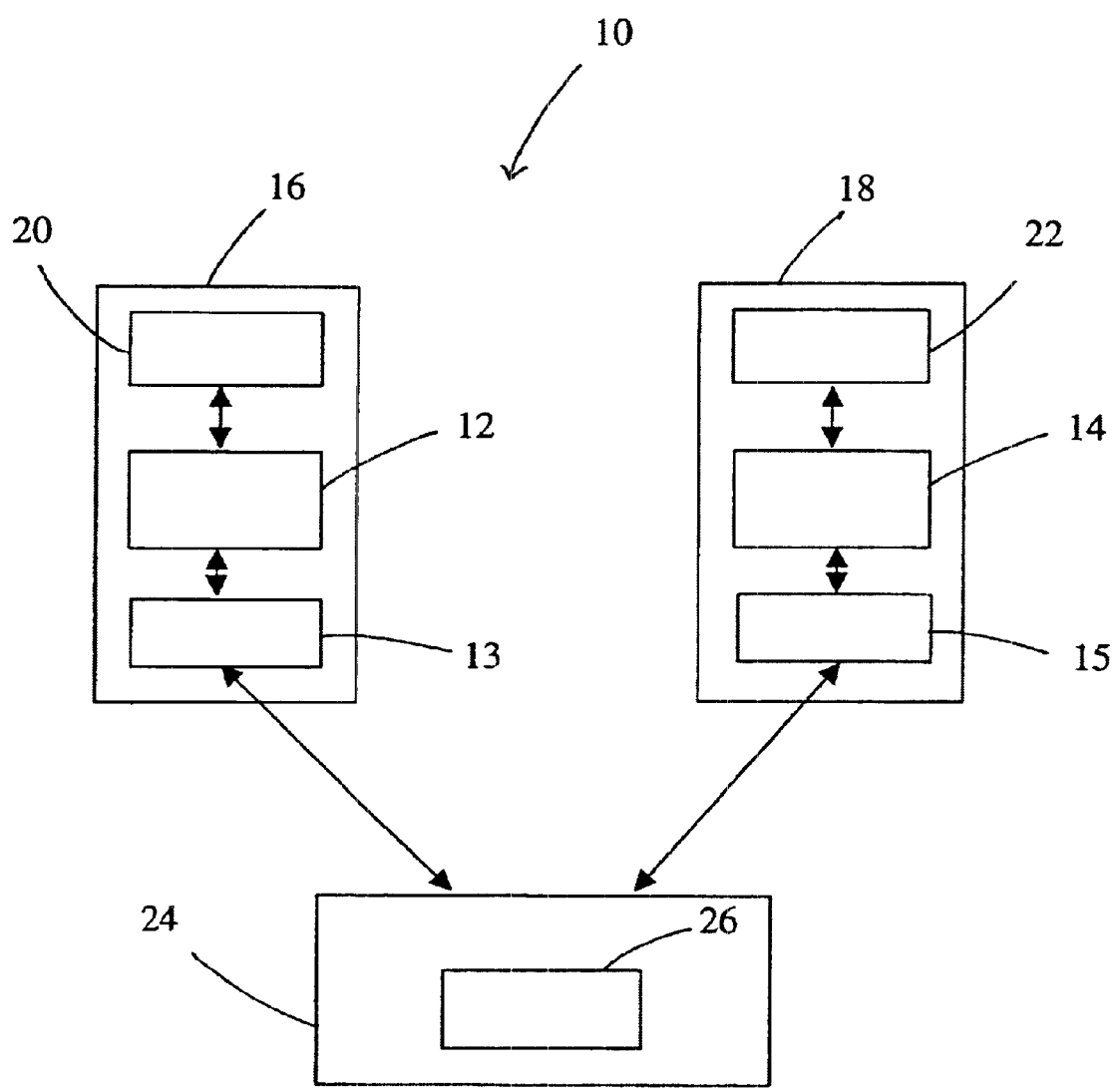
FIG. 1 is a schematic drawing of a system for generating industry-specific statistical information in accordance with an embodiment of the present invention.

Referring to FIG. 1, there is shown a system 10 for generating industry-specific statistical information which comprises first and second data gathering applications 12 and 14 respectively. Each of the first and second applications 12, 14 is associated with an individual member organisation 16, 18.

Each data gathering application 12, 14 is arranged to gather standard non-sensitive data about the computer systems of an organisation 16, 18.

The data gathered by the data gathering application may relate to information such as adoption of new technology, availability of technology, performance of technology, existence of technology within an organization, costs of technology or failure rate of technology.

Each data gathering application 12, 14 can be tailored by a member organisation to selectively alter the type of data that is gathered. This is important because it gives members complete control over the information gathering process since only data which has been approved by the members is gathered. Each member is able to monitor the data gathered by the data gathering application so that the member can verify that only appropriate system data which is approved by the member is being gathered.

When the appropriate systems data has been gathered for a member organisation, the data is stored in a member database 20, 22 located at the member organisation. This enables each member to view the gathered data in an organised way, to replay the member database, to generate summary reports of the information in the member database, to convert the information stored in the member database to another format, and so on.

The data stored in each member database 20, 22 is forwarded by a data forwarding application 13, 15 to a remote system database application 24 and the data is stored in the system database 26.

Using the information in the system database 26, the system database application 24 generates reports for each member, with each report containing statistical information indicative of how a member's computer systems and the member's use of the computer systems compares with the industry.

The system 10 is arranged so that data is gathered from the computer systems of the member organisations automatically, so that the gathered data is forwarded to the system database application 24 automatically, and so that the reports containing statistical information are generated and forwarded to the member organisations automatically.

It will be understood that because the system is not performing on-line monitoring applications, it is not necessary for the system to collate a large quantity of data over short time intervals. Instead, the system 10 collects small amounts of data over large time intervals. In this way, the size of the member database 20, 22 can be kept to a minimum thereby ensuring that the system 10 has a negligible impact on operation of the member's computer systems.

Specific information about each member which has been gathered from the member organisation and forwarded to the system database application 24 appears as specific information only on reports intended for the member. When the gathered information from each member is used to generate an industry aggregate figure, all information which identifies the member is removed, so that reports are provided to each member which exclude data specific to other member organisations. This ensures that it is not possible for other organisations to determine whether any particular company is involved with a system and no information about any of the individual member organisations can be obtained.

The system 10 is arranged such that data gathering and transfer is initiated, carried out and controlled from each member organisation and data transfer is one way in that the gathered data is transferable from the member databases 20, 22 to the system database 26 and is not transferable from the system database 26 to the member databases 20, 22. In addition, the system does not accept or respond to external commands. As a result, third parties are unable to access the system database application 24 and view information, and the system 10 is unable to monitor systems in the member organisations. However, since gathered data is stored on the member databases 20, 22 the members are able to view the gathered data at any time.

As discussed above, each member receives reports periodically, for example once each month, which provides the member with statistical information indicative of a comparison of characteristics of the computer systems of the member organisation with the industry as a whole. The reports received by each member exclude data which is specific to other member organisations.

Examples of information included in the reports are shown in FIGS. 2 to 8.

The reports indicate a comparison of information gathered from a member with the industry average.

The reports include information in both tabular form and graphical form and indicate comparisons of the respective member organisation with the industry average.

Long term information is also presented so as to provide the members with statistical information based on monthly, quarterly and yearly comparisons, as well as an indication of trends.

It will be understood that the information contained in the tables and corresponding graphs is not necessarily consistent as the tables and graphs are shown for example only.

The tables shown in FIG. 2a represent a general technology overview and provide a comparison of a member's current technology to the technology currently used in the industry as a whole. Using this report, a member is able to easily see if the member is using systems that are old or new in relation to systems that are currently in use by other members.

For example, by comparing columns 28 and 30 in FIG. 2a, the member is able to determine whether the systems currently in use in the member organisation are generally in line with or out of step with systems currently in use in the industry as a whole. In this example, it can be seen that the member represented by FIG. 2a is using systems which are generally in line with the industry since the figures shown in corresponding rows of columns 28 and 30 are of the same order and do not vary greatly.

In column 32 in FIG. 2a, an indication is given as to the current trends in the industry and in this column it can be seen that the industry seems to be discarding operating systems C Series, D2x and D3x.

In FIG. 2b, there is shown a comparison of a member's system CPU availability with the industry average in graphical format.

Figure 3:
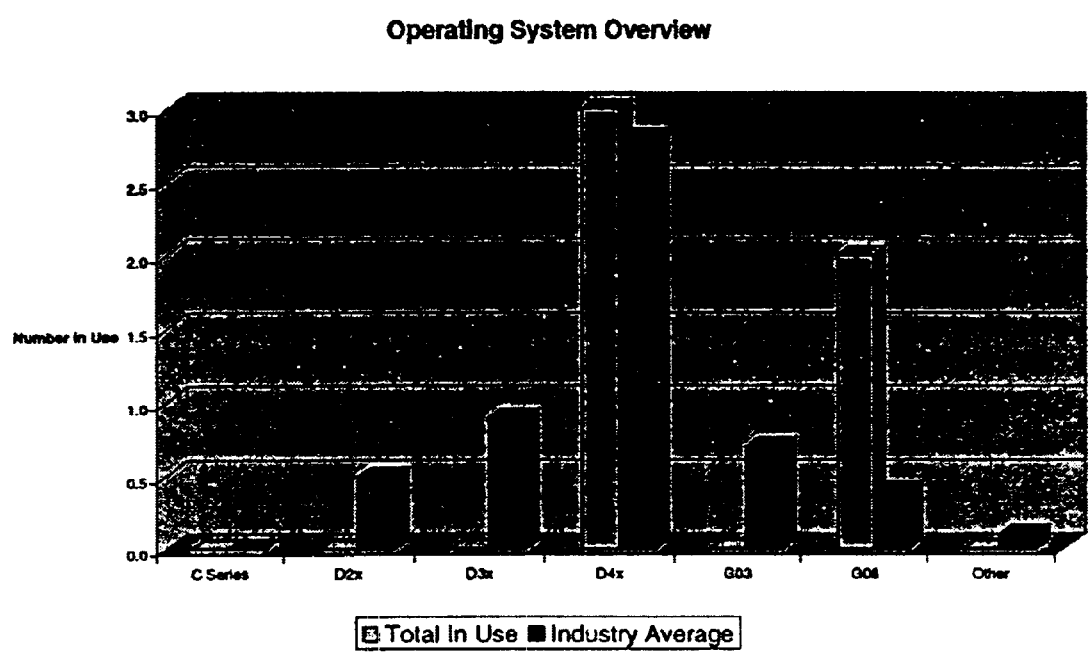

In FIG. 3, a comparison of a member's operating systems with the industry average operating systems is shown in graphical format. From this graph, it can be seen that the member is significantly ahead of the industry average in relation to the operating system G06 but lags behind the industry average in operating systems G03, D3x and D2x.

In FIG. 4, system availability comparison information is shown in both tabular format and graphical format.

From the graphical format in FIG. 4, it can readily be seen that the member's x.25 lines have a much lower availability than the industry average. In addition, it can also be seen that there is a negative trend in the member's organisation with regard to x.25 lines availability. This negative trend in relation to the industry average should alert the member organisation to a problem that may need to be addressed.

Figure 5:
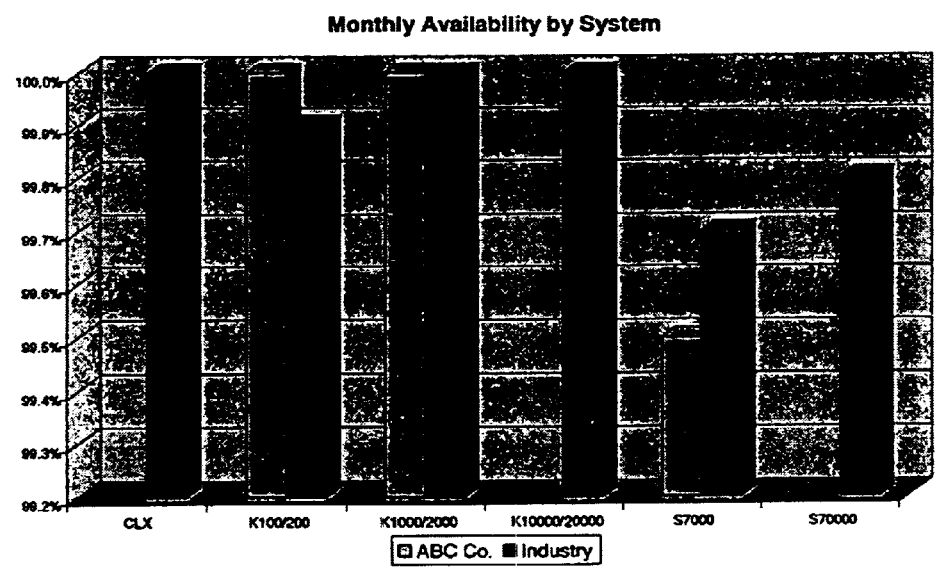

In FIG. 5, there is shown a comparison of a member's computer system availability with the industry average in graphical format.

Figure 6:
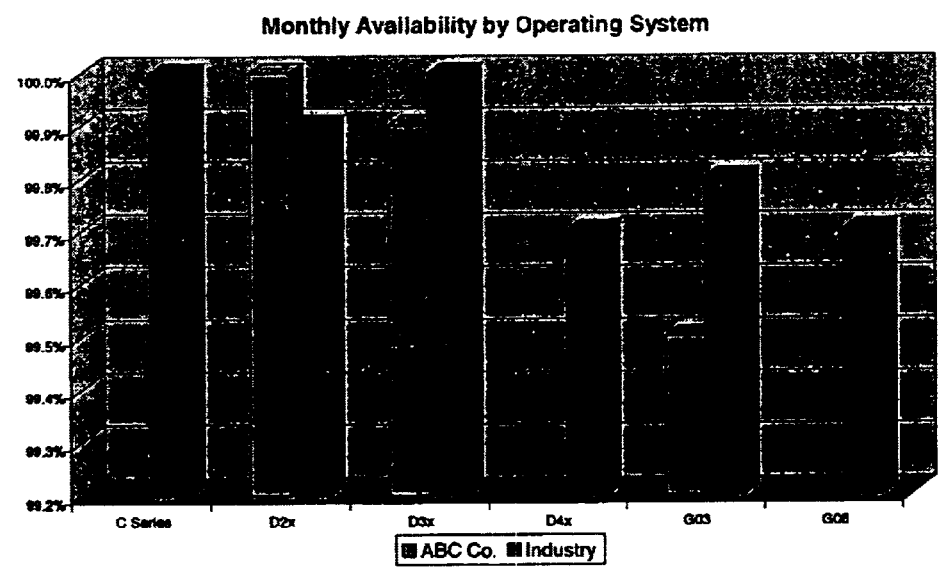

In FIG. 6, there is shown a comparison of a member's operating system availability with the industry average in graphical format.

Figure 7:
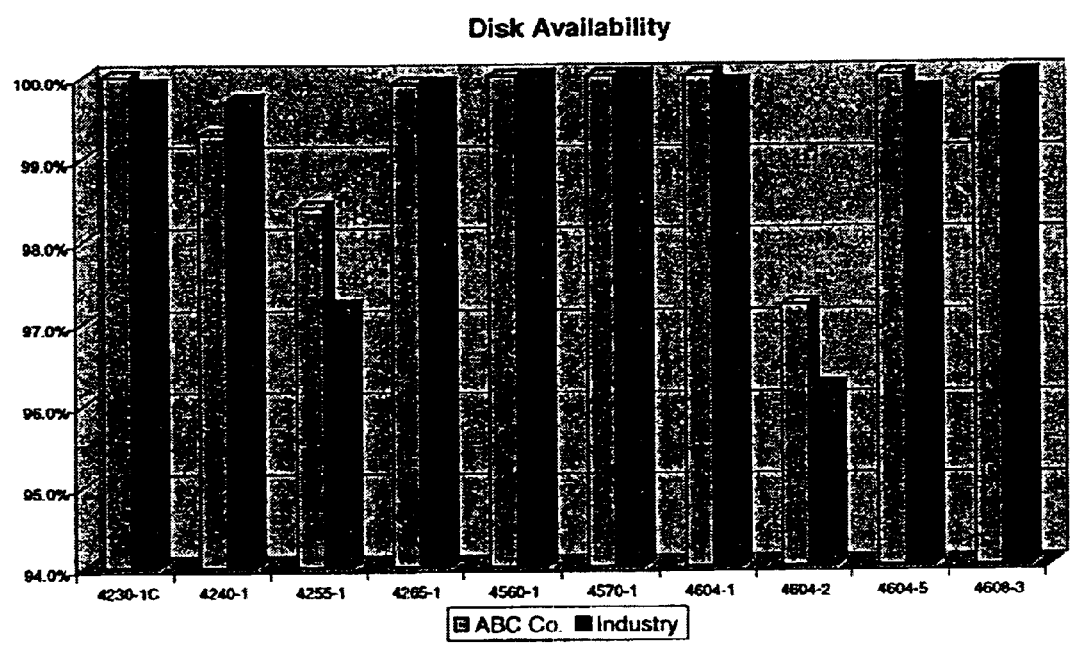

In FIG. 7, there is shown a comparison of a member's disk availability with the industry average in graphical format.

In FIG. 8, statistical information is shown relating to best practices. This information indicates which hardware is achieving the best availability in the industry. For example, the information indicates that the optimal configuration would be a K10000 running a D20 operating system with 4608-3 disks and a 5170 tape drive. Accordingly, a member organisation may be able to significantly improve the performance and availability of their systems by emulating the configuration presented in the Best Practice Report.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A system for generating and supplying industry-specific statistical information relating to use of computer systems in an industry, the system comprising:

a data gathering application for gathering non-sensitive computer system data from a plurality of members of the industry;

a system database application for storing said gathered data; and a data forwarding application for forwarding said gathered data to said system database application;

the system database application being arranged to generate and provide each member with statistical information indicative of a comparison of characteristics of the member's computer systems with average characteristics of a plurality of members' computer systems.

2. A system as claimed in claim 1, wherein the statistical information is in the form of at least one report.

3. A system as claimed in claim 1, wherein the statistical information is forwarded to the members by the system database application.

4. A system as claimed in claim 3, wherein the statistical information is forwarded to the members periodically.

5. A system as claimed in claim 1, wherein the statistical information includes information relating to adoption of new technology, availability of technology, performance of technology, existence of technology within an organisation, costs of technology or failure rate of technology.

6. A system as claimed in claim 1, further including a plurality of member databases, each member database being associated with and located at a member organisation, and each member database being arranged to store said gathered system data locally at the respective member organisation.

7. A system as claimed in claim 6, wherein each member database is arranged to allow access to the member database by the respective member associated with the member database.

8. A system as claimed in claim 1, wherein the system database application includes a system database for storing said gathered data which has been forwarded from the member organisations.

9. A system as claimed in claim 1, wherein the data gathering application is controllable by the respective member such that the type of data gathered by the data gathering application is selectable and modifiable by the respective member.

10. A system as claimed in claim 1, wherein the data forwarded to and stored in the system database application is not directly accessible by the members.

11. A system as claimed in claim 1, wherein the statistical information is represented in the form of at least one table.

12. A system as claimed in claim 1, wherein the statistical information is represented in the form of at least one graph.

13. A method of generating and supplying industry-specific statistical information relating to use of computer systems in an industry, the method comprising the steps of:
    gathering non-sensitive computer system data from a plurality of members of the industry;
    providing a system database application for storing said gathered data;
    forwarding said gathered data to said system database application; and
    generating and providing each member with statistical information indicative of a comparison of characteristics of the member's computer systems with average characteristics of a plurality of members' computer systems.

14. A method as claimed in claim 13, wherein the statistical information is in the form of at least one report.

15. A method as claimed in claim 13, wherein the statistical information is forwarded to the members periodically.

16. A method as claimed in claim 13, wherein the statistical information includes information relating to adoption of new technology, availability of technology, performance of technology, existence of technology within an organisation, costs of technology or failure rate of technology.

17. A method as claimed in claim 13, further including the steps of providing a plurality of member databases, each member database being associated with and located at a member organisation, and arranging each member database to store said gathered system data locally at the respective member organisation.

18. A method as claimed in claim 17, wherein each member database is arranged to allow access to the member database by the respective member associated with the member database.

19. A method as claimed in claim 13, wherein the step of gathering non-sensitive computer system data is controllable by the respective member such that the type of data gathered by the data gathering application is selectable and modifiable by the respective member.

20. A method as claimed in claim 13, wherein the data forwarded and stored in the system database application is not directly accessible by the members.

21. A statistics generating application for generating and supplying industry-specific statistical information relating to use of computer systems in an industry, said application comprising:
    a system database application for receiving non-sensitive computer system data from a plurality of members of the industry, for storing said received data, and for generating and providing each member with statistical information indicative of a comparison of characteristics of the member's computer systems with average characteristics of a plurality of members' computer systems.

22. An application as claimed in claim 21, wherein the statistical information includes information relating to adoption of new technology, availability of technology, performance of technology, existence of technology within an organisation, costs of technology or failure rate of technology.

23. An application as claimed in claim 21, wherein said data received by and stored in the system database application is not directly accessible by the members.

24. A method of generating and supplying industry-specific statistical information relating to use of computer systems in an industry, the method comprising the steps of:
    receiving non-sensitive computer system data from a plurality of members of the industry;
    providing a system database application for storing said gathered data; and
    generating and providing each member with statistical information indicative of a comparison of characteristics of the member's computer systems with average characteristics of a plurality of members' computer systems.

25. A method as claimed in claim 24, wherein the statistical information includes information relating to adoption of new technology, availability of technology, performance of technology, existence of technology within an organisation, costs of technology or failure rate of technology.

26. A method as claimed in claim 25, wherein said data received by and stored in the system database application is not directly accessible by the members.

27. A data gathering system for use in generating and supplying industry-specific statistical information relating to use of computer systems in an industry, said system comprising:
    a data gathering application for gathering non-sensitive computer system data from a member of an industry; and
    a data forwarding application for forwarding said gathered data to a system database application;
    the data gathering system being arranged to receive statistical information indicative of a comparison of characteristics of the member's computer systems with average characteristics of a plurality of members' computer systems, and to display the statistical information to a user.

28. A system as claimed in claim 27, wherein the statistical information includes information relating to adoption of new technology, availability of technology, performance of technology, existence of technology within an organisation, costs of technology or failure rate of technology.

29. A system as claimed in claim 27, further including a member database, the member database being located at the member organisation, and the member database being arranged to store said gathered system data locally at the member organisation.

30. A system as claimed in claim 29, wherein the system is arranged to allow access to the member database by the member associated with the member database.

31. A system as claimed in claim 27, wherein the data gathering application is controllable by the member such that the type of data gathered by the data gathering application is selectable and modifiable by the respective member.

32. A computer program which when loaded onto a computer causes the computer to operate in accordance with a data gathering system for use in generating and supplying industry-specific statistical information relating to use of computer systems in an industry, said system comprising:

a data gathering application for gathering non-sensitive computer system data from a member of an industry; and a data forwarding application for forwarding said gathered data to a system database application;

the data gathering system being arranged to receive statistical information indicative of a comparison of characteristics of the member's computer systems with average characteristics of a plurality of members' computer systems, and to display the statistical information to a user.

33. A computer readable medium having a computer program embodied therein which when loaded onto a computer causes the computer to operate in accordance with a data gathering system for use in generating and supplying industry-specific statistical information relating to use of computer systems in an industry, said system comprising:

a data gathering application for gathering non-sensitive computer system data from a member of an industry; and a data forwarding application for forwarding said gathered data to a system database application;

the data gathering system being arranged to receive statistical information indicative of a comparison of characteristics of the member's computer systems with average characteristics of a plurality of members' computer systems, and to display the statistical information to a user.

\* \* \* \* \*